(12) United States Patent
Suzuki et al.

(10) Patent No.: US 11,884,265 B1
(45) Date of Patent: Jan. 30, 2024

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Muku Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/033,850

(22) PCT Filed: Nov. 2, 2020

(86) PCT No.: PCT/IB2020/000915
§ 371 (c)(1),
(2) Date: Sep. 12, 2023

(87) PCT Pub. No.: WO2022/090758
PCT Pub. Date: May 5, 2022

(51) Int. Cl.
*H04N 5/44* (2011.01)
*B60W 30/06* (2006.01)
*G06V 20/58* (2022.01)

(52) U.S. Cl.
CPC .......... *B60W 30/06* (2013.01); *G06V 20/586* (2022.01); *B60W 2420/42* (2013.01)

(58) Field of Classification Search
CPC .. B60W 30/06; B60W 2420/42; G06V 20/586
See application file for complete search history.

(56) References Cited

U.S. PATENT DOCUMENTS

| | | | |
|---|---|---|---|
| 2018/0215413 A1* | 8/2018 | Inagaki | B62D 15/0285 |
| 2020/0017099 A1 | 1/2020 | Yamaguchi et al. | |
| 2020/0258388 A1 | 8/2020 | Nakka et al. | |
| 2020/0282975 A1* | 9/2020 | Minase | B60L 15/30 |
| 2020/0361462 A1* | 11/2020 | Noguchi | B60W 30/143 |

(Continued)

FOREIGN PATENT DOCUMENTS

| JP | 2007-011994 A | 1/2007 |
|---|---|---|
| JP | 2007-315956 A | 12/2007 |

(Continued)

OTHER PUBLICATIONS

Huang, Y. et al., Vision-based Semantic Mapping and Localization for Autonomous Indoor Parking, 2018 IEEE Intelligent Vehicles Symposium, Jun. 2018, pp. 636-641.

(Continued)

*Primary Examiner* — Munear T Akki
(74) *Attorney, Agent, or Firm* — Young Basile Hanlon & MacFarlane, P.C.

(57) ABSTRACT

A plurality of different reference images for specifying a target parking space is preliminarily stored. The different reference images are generated by using an imaging device that captures an image around a subject vehicle. After that, when the subject vehicle is parked in the target parking space, the current image captured around the subject vehicle is verified with at least one reference image of the plurality of different reference images to recognize the target parking space, and the travel operation of the subject vehicle to the target parking space is autonomously controlled based on positional information of the recognized target parking space.

8 Claims, 11 Drawing Sheets

(56) References Cited

U.S. PATENT DOCUMENTS

| | | | | |
|---|---|---|---|---|
| 2020/0361489 A1* | 11/2020 | Park | ................. | B60W 50/0097 |
| 2020/0401127 A1* | 12/2020 | Kramer | ................. | G08G 1/144 |
| 2021/0086756 A1* | 3/2021 | Hasejima | .............. | B60W 50/14 |
| 2021/0179085 A1* | 6/2021 | Nakada | ................. | B60W 30/06 |
| 2021/0380096 A1* | 12/2021 | Katoh | ............... | B62D 15/0285 |

FOREIGN PATENT DOCUMENTS

| | | | |
|---|---|---|---|
| JP | 2009-111536 A | 5/2009 |
| JP | 2016-197314 A | 11/2016 |
| JP | 2017-067466 A | 4/2017 |
| JP | 2018-163530 A | 10/2018 |
| JP | 2019-202697 A | 11/2019 |

OTHER PUBLICATIONS

Jung, H.G. et al., Parking Slot Markings Recognition for Automatic Parking Assist System, 2006 IEEE Intelligent Vehicles Symposium, Jun. 2006, pp. 106-113.

* cited by examiner

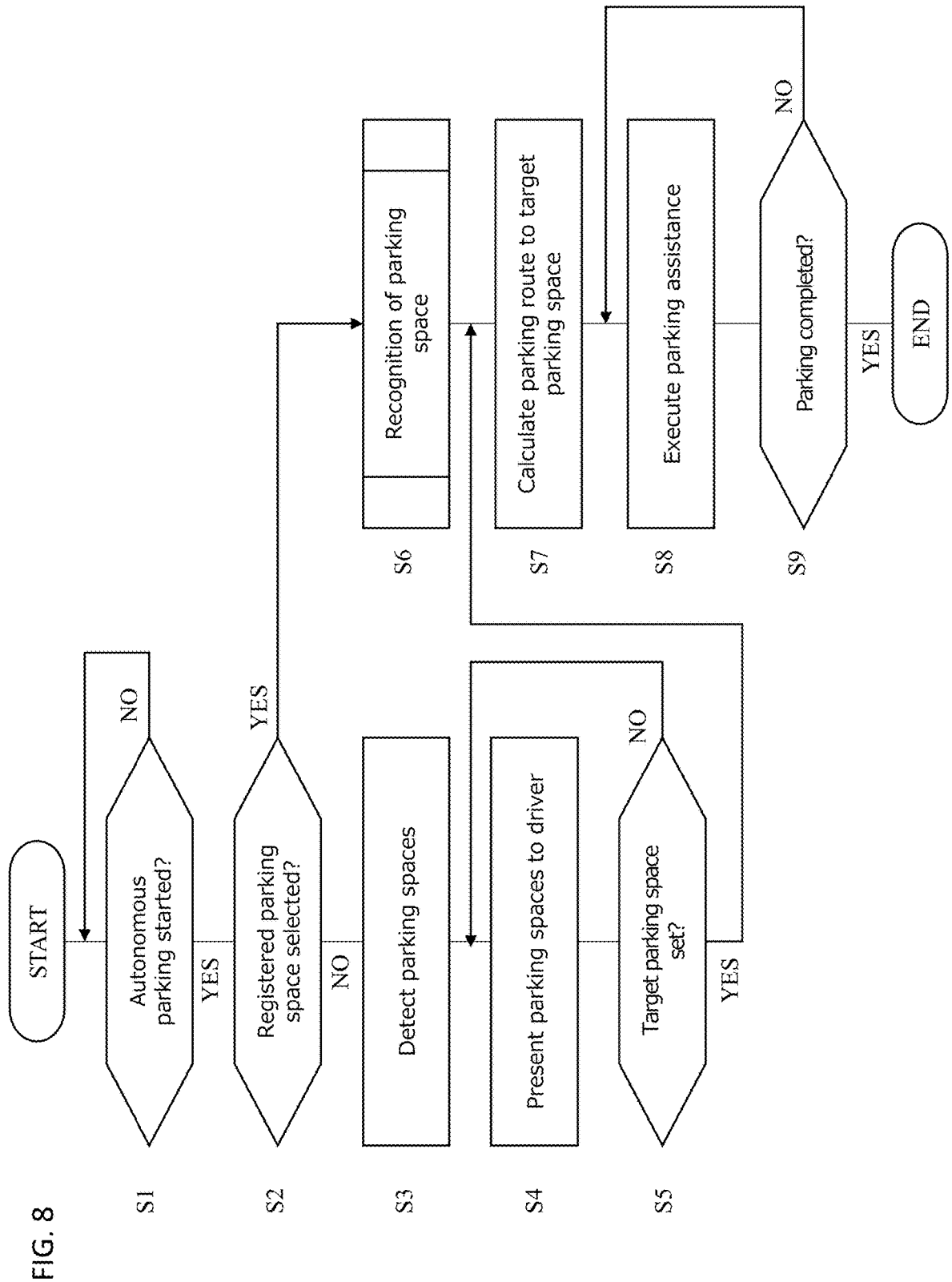

PARKING ASSISTANCE METHOD AND PARKING ASSISTANCE DEVICE

TECHNICAL FIELD

The present invention relates to a parking assistance method and a parking assistance device.

BACKGROUND

A parking assistance device is known, in which positional information or the like of parking spaces are preliminarily registered for parking lots that are used relatively frequently, and after that when parking in a parking space, the positional information of the parking space is read out from a memory to execute parking assistance control (JP2019-202697A). This parking assistance device uses four cameras provided at the front bumper, rear trunk, and right and left door mirrors of a vehicle to generate a viewpoint image of the vehicle and its peripheral area viewed from one virtual viewpoint, for example, an overhead image viewed from just above the vehicle, and register parking spaces captured in the image in a memory or verify the parking spaces with a template image that is registered in the memory.

SUMMARY

In the above prior art, however, one overhead image is generated and this is used as an image around the vehicle captured at the current stop position or stored as a template image. There is therefore a problem in that if the current image captured around the subject vehicle or the template image itself registered preliminarily in the memory is an image that is not suitable for recognition processing, such as an image without features that are easy to verify, the accuracy in recognizing a target parking space for parking from now will deteriorate.

A problem to be solved by the present invention is to provide a parking assistance method and a parking assistance device with high accuracy in recognizing a target parking space.

The present invention solves the above problem through preliminarily storing a plurality of different reference images including a target parking space, the reference images being generated by capturing an image around a subject vehicle using an imaging device in a state in which the subject vehicle is parked in the target parking space, the imaging device being equipped in the subject vehicle; and after that when parking the subject vehicle in the target parking space, verifying a current image captured around the subject vehicle with at least one reference image of the plurality of different reference images to recognize the target parking space; and autonomously controlling a travel operation of the subject vehicle to the target parking space based on positional information of the recognized target parking space. According to the present invention, the plurality of different reference images are used to execute a verification process for the target parking space, and it is therefore possible to provide a parking assistance method and a parking assistance device with high accuracy in recognizing the target parking space.

BRIEF DESCRIPTION OF THE DRAWINGS

FIG. 8 is a flow chart illustrating an example of a parking control procedure executed by the parking assistance device of FIG. 1;

DETAILED DESCRIPTION

Figure 1:
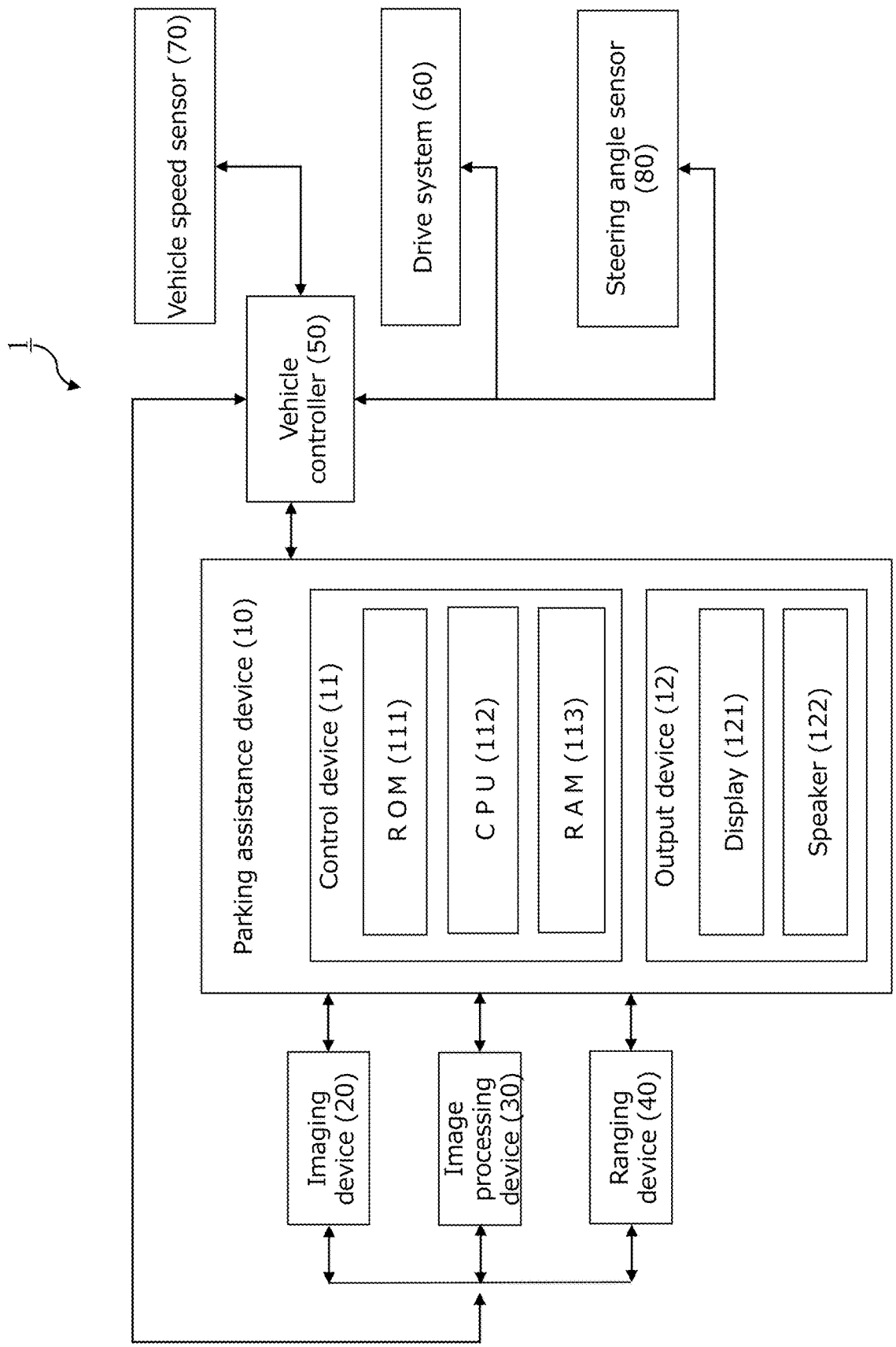
FIG. 1 is a block diagram illustrating an embodiment of a parking assistance system to which the parking assistance method and parking assistance device of the present invention are applied.

Hereafter, one or more examples of modes for carrying out the present invention will be described with reference to the drawings. FIG. 1 is a block diagram illustrating an embodiment of a parking assistance system 1 to which the parking assistance method and parking assistance device of the present invention are applied. Although not particularly limited, the parking assistance system 1 described below is used to preliminarily register a parking space of a parking lot that is used relatively frequently, such as a parking lot at home or a parking lot at workplace, and after that when parking a subject vehicle in the registered parking space, assist an parking operation using information on the preliminarily registered parking space and autonomous travel control.

The parking assistance system 1 of the present embodiment includes a parking assistance device 10, an imaging device 20, an image processing device 30, a ranging device 40, a vehicle controller 50, a drive system 60, a vehicle speed sensor 70, and a steering angle sensor 80. These devices are connected to one another via a controller area network (CAN) or other onboard LAN to mutually exchange information.

The parking assistance device 10 of the present embodiment includes a control device 11 and an output device 12. The control device 11 is a computer including a read only memory (ROM) 111 that stores a parking assistance program, a central processing unit (CPU) 112 that executes the program stored in the ROM 111, and a random access memory (RAM) 113 that serves as an accessible storage device. The ROM 111 according to the present embodiment stores a parking assistance program for detecting a parking space in which, for example, the subject vehicle can be parked, displaying the parking space on a display 121, calculating a parking route for parking the subject vehicle in a target parking space that is set by a driver, and executing autonomous travel or the like for the subject vehicle to travel along the parking route. When there is a preliminarily registered parking space and setting is performed by the driver to park in the parking space, the parking assistance program may be modified to, instead of detecting a parking space in which the subject vehicle can be parked, calculate a parking route for parking the subject vehicle in the registered target parking space (if the parking route is preliminarily registered, read out it from a memory) and execute autonomous travel or the like for the subject vehicle to travel along the parking route. The output device 12 includes a display 121 for presenting the driver with image information, such as image information of parking spaces that are candidates for parking the subject vehicle, and a speaker 122 for outputting instructions, etc. to the driver by voice.

The parking assistance device 10 of the present embodiment can be applied not only to autonomous parking in which all of the steering, accelerator, and brake are autonomously operated, but also to semi-autonomous parking in which at least one of the steering, accelerator, and brake is manually operated while the remaining operations are autonomously controlled. The parking assistance device 10 of the present embodiment can also be applied to parking assistance in which the parking route is presented to the drive and the driver manually operates the steering, accelerator, and brake to park the subject vehicle in the target parking space. When performing the autonomous parking or semi-autonomous parking, it is more preferred to use a momentary-type switch such as a deadman switch. This is because in the parking assistance device 10 using a deadman switch, the autonomous travel control of the subject vehicle is executed only when the deadman switch is pressed, and when the deadman switch is released, the autonomous travel control and semi-autonomous driving control of the subject vehicle are stopped.

The parking assistance device 10 may be remotely operated by a signal transmitted from a mobile terminal device (equipment such as a smart phone or PDA) capable of exchanging information with the parking assistance device 10. For example, the parking assistance device 10 of the present embodiment can be applied to remote parking in which the driver operates and parks the subject vehicle from outside the subject vehicle.

The imaging device 20, image processing device 30, and ranging device 40 of the present embodiment are devices for detecting information on the travel environment including white lines representing parking spaces located around the subject vehicle, for example, in the entire circumference of the subject vehicle, such as the front, sides, and rear of the subject vehicle, curbstones, steps, or walls that serve as landmarks for parking spaces, obstacles present around the subject vehicle, etc. and other situations around the subject vehicle.

The imaging device 20 of the present embodiment is an onboard device for recognizing the information on the travel environment around the subject vehicle from images. The imaging device 20 captures images around the subject vehicle and acquires image data including white lines representing parking spaces existing around the subject vehicle, curbstones, steps, or walls that serve as landmarks for parking spaces, and obstacles present around the subject vehicle, thereby acquiring the information on the travel environment around the subject vehicle. The imaging device 20 includes cameras having imaging elements such as CCDs, ultrasonic cameras, infrared cameras, or other cameras. The information on the travel environment around the subject vehicle acquired by the imaging device 20 is output to the control device 11.

Figure 2:
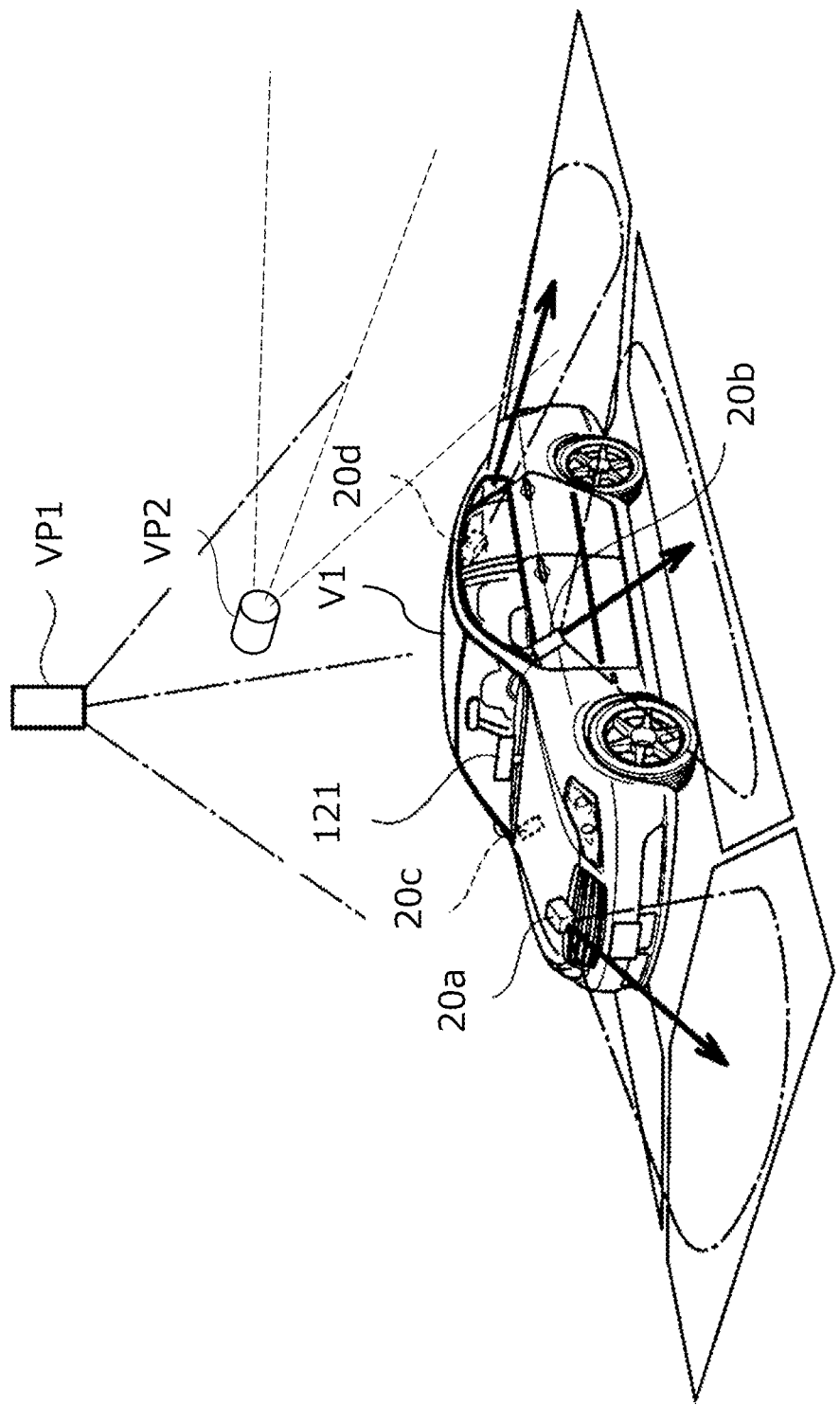
FIG. 2 is a perspective view illustrating an imaging device of the parking assistance system of FIG. 1.

FIG. 2 is a perspective view illustrating the imaging device 20 of the parking assistance system 1 of the present embodiment and illustrates an arrangement example of components of the imaging device 20 equipped in a subject vehicle V1. In the arrangement example illustrated in FIG. 2, an imaging device 20a is disposed on the front grill portion of the subject vehicle V1, an imaging device 20b is disposed on the lower portion of the left door mirror, an imaging device 20c is disposed on the lower portion of the right door mirror, and an imaging device 20d is disposed on the upper portion of the rear bumper. The imaging devices 20a to 20d may be cameras having wide-angle lenses with wide viewing angles. As illustrated in FIG. 2, the imaging device 20a mainly captures images of objects located from the front right to the front left of the subject vehicle V1, the imaging device 20b mainly captures images of objects located from the front left to the rear left of the subject vehicle V1, the imaging device 20c mainly captures images of objects located from the front right to the rear right of the subject vehicle V1, and the imaging device 20d mainly captures images of objects located from the rear right to the rear left of the subject vehicle V1. By arranging the components of the imaging device 20 in this way, it is possible to reduce blind spots from which information cannot be acquired when acquiring the environment information around the subject vehicle V1. The motion stereo technique using the imaging devices 20a to 20d may be used for the detection of obstacles by the imaging device 20.

The image processing device 30 of the present embodiment is a device for generating an overhead image that represents the situation around the subject vehicle V1 when the subject vehicle V1 is viewed from a virtual viewpoint above the subject vehicle V1. The virtual viewpoint is, for example, a virtual viewpoint VP1 illustrated in FIG. 2. The image processing device 30 generates the overhead image using a plurality of captured images acquired with the imaging device 20. The image processing performed for generating the overhead image in the image processing device 30 is not particularly limited, but may be conducted, for example, using a processing method described in "Development of Around View System, Proceedings of Society of JSAE Annual Congress, 116-07 (October 2007), pp. 17-22, SUZUKI Masayasu, CHINOMI Satoshi, TAKANO Teruhisa." The overhead image generated by the image processing device 30 is output to the control device 11 and presented to the driver by the display 121 illustrated in FIGS. 2 and 3. The display 121 illustrated in FIG. 2 is disposed on the upper portion of the dashboard between the driver seat and the front passenger seat, but the installation position of the display 121 is not particularly limited, and it may be installed at an appropriate position that is visible to the driver. The image displayed on the display 121 is an overhead image viewed from the virtual viewpoint VP1, but an image or the like viewed in the horizontal direction from another virtual viewpoint VP2 can also be generated by a similar image conversion method and may be used for registration of parking spaces, which will be described later. Details will be described later.

Figure 3:
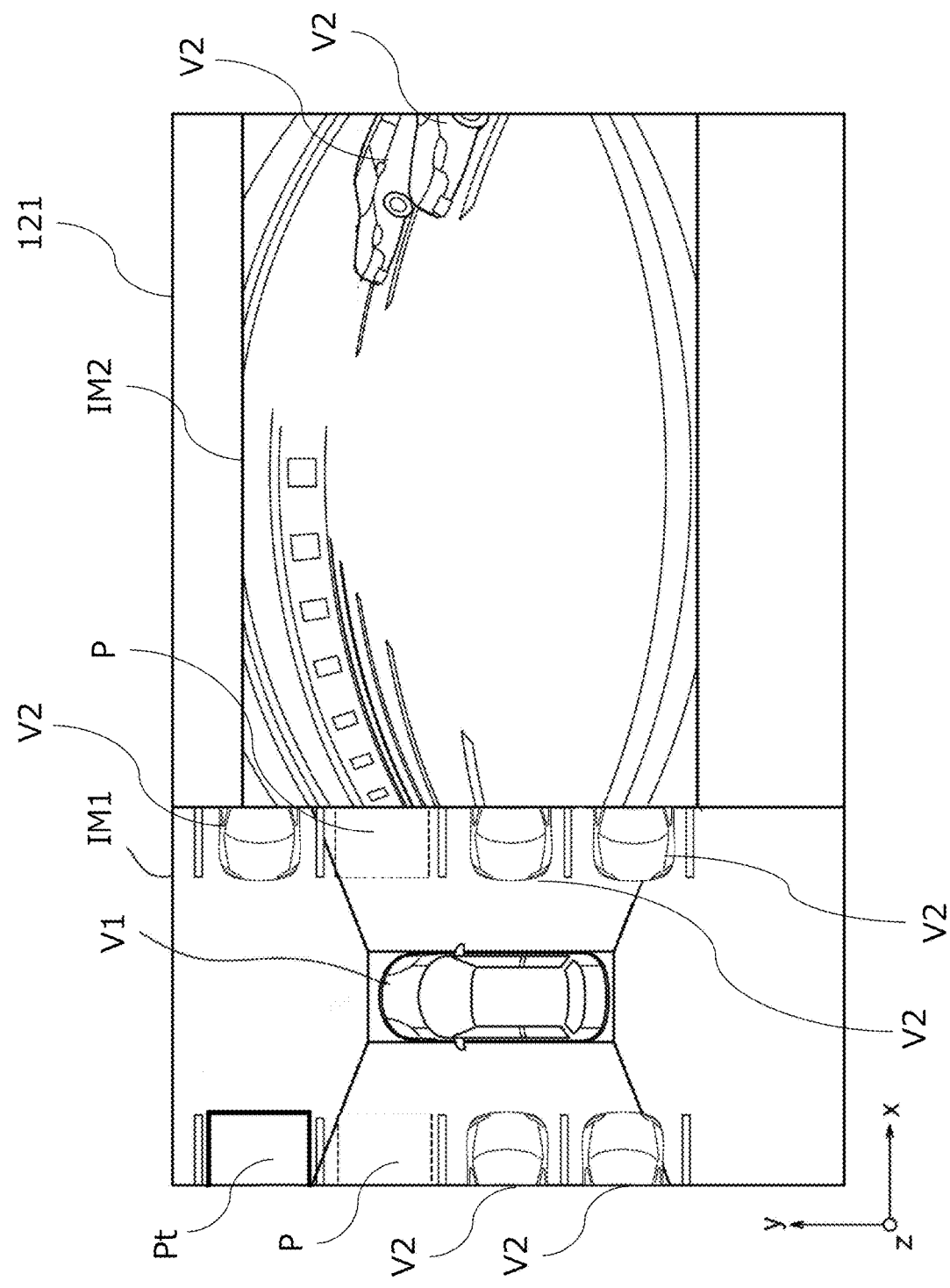
FIG. 3 is an example of an image displayed on a display illustrating an overhead image generated by an image processing device of the parking assistance system of FIG. 1.

FIG. 3 is a display screen of the display 121 illustrating an example of the overhead image generated by the image processing device 30. FIG. 3 illustrates a scene in which the subject vehicle V1 is slowly moving through a parking lot to find a suitable parking space P. An overhead image IM1 generated by the image processing device 30 is displayed on the left side of the display screen of the display 121 illustrated in FIG. 3, and a monitor image IM2 for monitoring around the subject vehicle V1 is displayed on the right side. The subject vehicle V1 is displayed at the center of the overhead image IM1, and parking spaces separated by white lines are displayed on the right and left sides of the subject vehicle V1. These parking spaces include those in which other vehicles V2 are detected, and the other vehicles V2 are displayed in respective parking spaces. On the other hand, for parking spaces in which obstacles such as other vehicles V2 are not detected, dashed frames are displayed to indicate parking spaces P as spaces in which the subject vehicle V1 can be parked. A target parking space Pt selected by the driver from among the parking spaces P is displayed with a thick solid line frame. On the other hand, the monitor image IM2 is displayed with an image acquired from the imaging device 20a disposed on the front grill portion of the subject vehicle V1 in order to present the surrounding environment information ahead of the subject vehicle V1 in the current travel direction. Obstacles such as other vehicles V2 are displayed in the monitor image IM2 in addition to the parking spaces separated by white lines.

The ranging device 40 of the present embodiment is a device for calculating the relative distance and relative speed between the subject vehicle V1 and an object. The ranging device 40 is, for example, a radar device such as a laser radar, a millimeter wave radar or laser range finder (LRF), a light detection and ranging unit (LiDAR unit), or an ultrasonic radar, or a sonar. The ranging device 40 detects the presence or absence of an object, the position of the object, and the distance to the object based on the received signal from the radar device or sonar. The object is, for example, an obstacle, a pedestrian, a bicycle, or other vehicle around the subject vehicle V1. Information on the object detected by the ranging device 40 is output to the control device 11. When the subject vehicle V1 is likely to come into contact with the object detected by the ranging device 40 during parking assistance, the control device 11 controls the subject vehicle V1 to stop and informs the driver via the display 121 and/or the speaker 122 that the object and the subject vehicle V1 are approaching each other.

Figure 4:
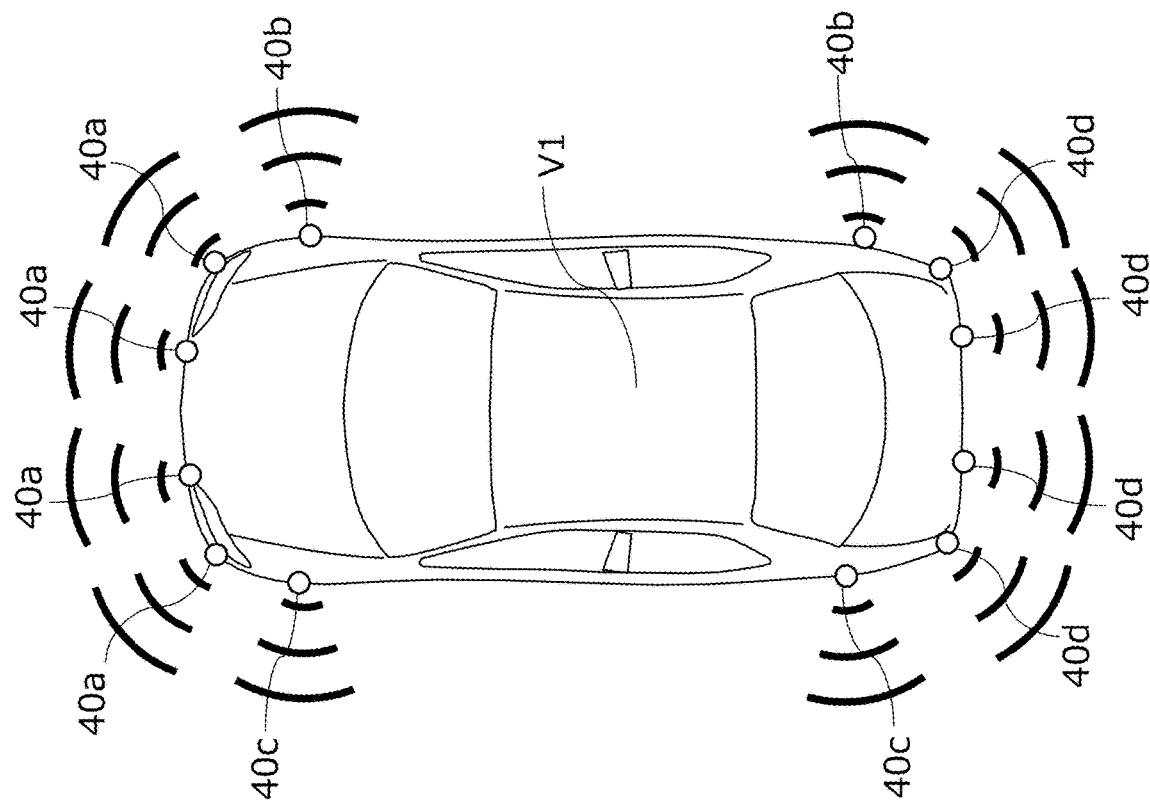
FIG. 4 is a plan view illustrating a ranging device of the parking assistance system of FIG. 1.

FIG. 4 is a plan view illustrating the ranging device 40 of the parking assistance system 1 of the present embodiment and illustrates an example of arrangement when components of the ranging device 40 are equipped in the subject vehicle V1. The subject vehicle V1 illustrated in FIG. 4 is provided with four front ranging devices 40a for detecting objects ahead of the subject vehicle V1, two right-side ranging devices 40b for detecting objects on the right side of the subject vehicle V1, two left-side ranging devices 40c for detecting objects on the left side of the subject vehicle V1, and four rear ranging devices 40d for detecting objects behind the subject vehicle V1. These ranging devices 40a to 40d can be installed, for example, on the front bumper and rear bumper of the subject vehicle V1. By arranging the components of the ranging device 40 in this manner, it is possible to accurately calculate the relative distance and relative speed between the subject vehicle V1 and an surrounding object.

Referring again to FIG. 1, the vehicle controller 50 of the present embodiment is an onboard computer such as an electronic control unit (ECU) for electronically controlling the drive system 60 which rules the driving of the subject vehicle V1. The vehicle controller 50 controls the drive device, braking device, and steering device included in the drive system 60, and when executing the parking assistance routine, assists the travel operation for the subject vehicle V1 to move to and park in a target parking space Pt from the current position. The vehicle controller 50 receives a control command based on the preliminarily calculated parking route, target vehicle speed, and target steering angle from the parking assistance device 10. Details of the parking route, target vehicle speed, and target steering angle will be described later.

The drive system 60 of the present embodiment includes various devices, such as an internal combustion engine and/or an electric motor as the travel drive sources, a power transmission device including a drive shaft and a transmission that transmit the output from these travel drive sources to the drive wheels, a braking device that brakes the wheels, and a steering device that controls the steered wheels in accordance with the steering angle of the steering wheel (so-called steering handle). When executing the parking assistance routine, the vehicle controller 50 receives a control command based on the preliminarily calculated parking route and target vehicle speed from the parking assistance device 10. Then, the vehicle controller 50 generates control signals for the drive device and braking device of the drive system 60 based on the control command from the parking assistance device 10 and executes control of driving behavior including the acceleration and deceleration of the vehicle. The drive system 60 can autonomously control the vehicle speed of subject vehicle V1 by receiving the control signals from the vehicle controller 50.

The drive system 60 includes a steering device. The steering device includes a steering actuator, which includes a motor and the like attached to a steering column shaft. When executing the parking assistance routine, the steering device of the drive system 60 is controlled by the vehicle controller 50 so that the subject vehicle travels while maintaining a predetermined lateral position (position in the lateral direction of the vehicle) with respect to the preliminarily calculated parking route. Additionally or alternatively, the vehicle controller 50 performs control of the steering device using at least one or more of the environment information around the subject vehicle V1 acquired by the imaging device 20, the overhead image IM1 generated by the image processing device 30, and the information on the obstacles, pedestrians, and other vehicles around the subject vehicle V1 detected by the ranging device 40. In this case, the parking assistance device 10 transmits to the vehicle controller 50 a control command based on the parking route and target steering angle which are preliminarily calculated. Then, the vehicle controller 50 generates a control signal to the steering device of the drive system 60 based on the control command from the parking assistance device 10 and executes the steering control of the subject vehicle V1. The drive system 60 can autonomously control the steering of the subject vehicle V1 by receiving the control signal from the vehicle controller 50.

The vehicle speed sensor 70 of the present embodiment is a sensor provided in the drive device of the drive system 60 for detecting the vehicle speed of the subject vehicle V1. The steering angle sensor 80 of the present embodiment is a sensor provided in the steering device of the drive system 60 for detecting the steering angle of the subject vehicle V1. The vehicle speed of the subject vehicle V1 detected by the vehicle speed sensor 70 and the steering angle of the subject vehicle V1 detected by the steering angle sensor 80 are output to the control device 11 via the vehicle controller 50.

The control device 11 of the present embodiment executes with the CPU 112 the parking assistance program stored in the ROM 111 thereby to achieve an environment information acquisition function of acquiring the environment information around the subject vehicle V1, a parking space detection function of detecting parking areas in which the subject vehicle V1 can be parked, a parking space display function of displaying the detected parking spaces P as the overhead image IM1 on the display 121, a parking route calculation function of calculating the parking route for the subject vehicle V1 to move to and park in the target parking space Pt from the current position, and a travel operation planning function of planning the travel operation for the subject vehicle V1 to park along the calculated parking route.

The control device 11 of the present embodiment uses the environment information acquisition function to acquire information on the surrounding environment including the presence of obstacles located around the subject vehicle V1. For example, the control device 11 uses the environment information acquisition function to acquire, as the information on the surrounding environment, the vehicle speed information of the subject vehicle V1 detected by the vehicle speed sensor 70 and the steering angle information of the subject vehicle V1 detected by the steering angle sensor 80. Additionally or alternatively, for example, the control device 11 uses the environment information acquisition function to acquire, as the information on the surrounding environment, the positional information of the subject vehicle V1 detected by the subject vehicle position detection device including a GPS unit, a gyro sensor, etc. or the positional information of the subject vehicle V1 detected with a three-dimensional high-precision map stored in the ROM 111 (including positional information of various facilities and specific points). Additionally or alternatively, the control device 11 may use the environment information acquisition function together with the information on the surrounding environment to automatically determine whether or not the travel situation of the subject vehicle V1 is in a scene of parking the subject vehicle V1 in the target parking space Pt.

The parking space detection function is a function for detecting parking areas in which the subject vehicle V1 can be parked, using the environment information around the subject vehicle V1 acquired by the environment information acquisition function. Upon detection of the parking spaces P, the control device 11 uses one or more captured images acquired by the imaging device 20 to create the overhead image IM1 with the image processing device 30. The control device 11 uses the parking space detection function to detect lines that define the boundaries of areas from the created overhead image IM1, and specifies line candidates that define the parking areas from the detected lines. Then, the control device 11 uses the parking space detection function to determine whether or not the specified line candidates define the parking areas, and when determining that the specified line candidate define the parking areas, determines whether or not the subject vehicle V1 can be parked in the detected parking areas.

To detect lines that define the boundaries of areas from the overhead image IM1, the control device 11 uses the parking space detection function to perform edge detection on the overhead image IM1 and calculate a luminance difference (contrast). Then, the control device 11 uses the parking space detection function to specify a pixel row whose luminance difference is equal to or larger than a predetermined value from the overhead image IM1 and calculate the thickness and length of the lines. The color of the detected lines does not necessarily have to be white, and may be red, yellow, or other colors.

Figure 5C:
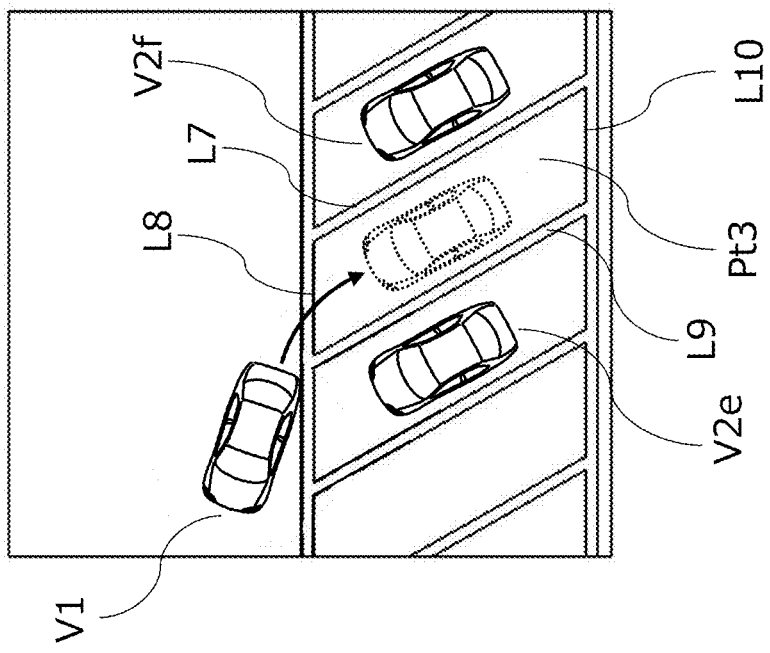
FIGS. 5A-5C are plan views illustrating examples of patterns of lines that define a parking space according to an embodiment of the present invention.

To specify line candidates that define the parking areas from the detected lines, the control device 11 uses a known image processing technique such as pattern matching. Patterns used for pattern matching are preliminarily stored in the ROM 111 of the control device 11. For example, FIG. 5A illustrates a scene in which the subject vehicle V1 is about to park in the target parking space Pt1, located between another vehicle V2a and still another vehicle V2b, in which the subject vehicle V1 can be parked. In the scene of FIG. 5A, the lines defining the parking space corresponding to the target parking space Pt1 are three sides of lines L1, L2, and L3 among the sides constituting the rectangle of the target parking space Pt1. The ROM 111 of the control device 11 stores a combination of lines L1, L2, and L3 defining the parking space as a pattern corresponding to the scene of FIG. 5A.

Figure 5B:
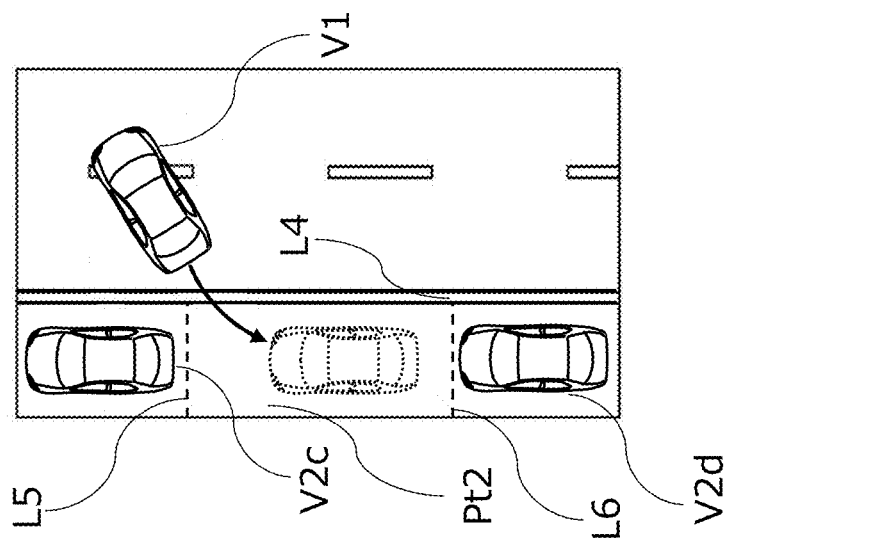
Figure 5A:
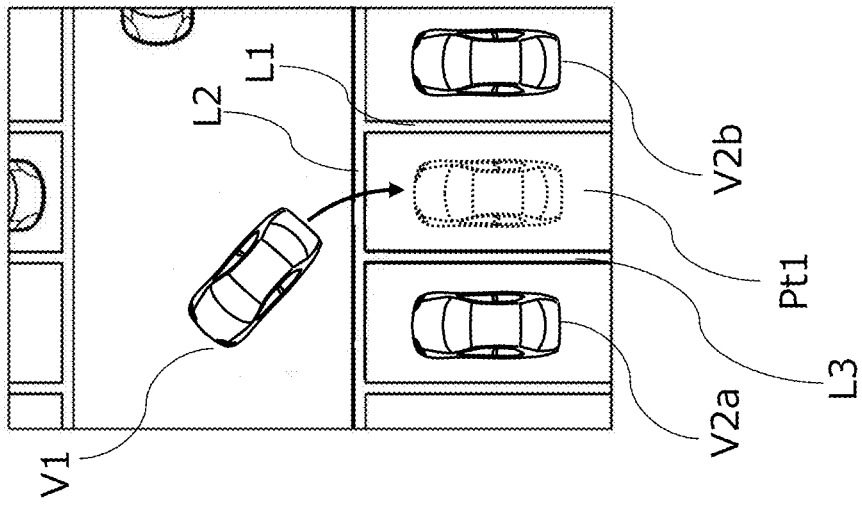

FIG. 5B illustrates a scene in which the subject vehicle V1 is about to parallel park in a target parking space Pt2 between another vehicle V2c and still another vehicle V2d. In the scene of FIG. 5B, the control device 11 uses the imaging device 20 to detect a line L4 as the line defining the parking space corresponding to the target parking space Pt2 and further detect the curbstones, walls, or the like (not illustrated) located on the left side of the other vehicles V2c and V2d. Unfortunately, however, the control device 11 cannot recognize the parking space only from the line L4 and the curbstones. In the scene of FIG. 5B, therefore, the control device 11 sets a virtual line L5 behind the other vehicle V2c and a virtual line L6 ahead of the other vehicle V2d. Then, when the parking space can be recognized by adding the virtual lines L5 and L6 to the line L4 detected by the imaging device 20, the control device 11 determines that the line L4 is a line that defines the parking space. The ROM 111 of the control device 11 stores a combination of the line L4, the virtual line L5 disposed behind the other vehicle V2c, and the virtual line L6 disposed ahead of the other vehicle V2d as a pattern corresponding to the scene of FIG. 5B.

FIG. 5C illustrates a scene in which the subject vehicle V1 is about to park obliquely in a target parking space Pt3, located between another vehicle V2e and still another vehicle V2f, in which the subject vehicle V1 can be parked. In the scene of FIG. 5C, lines that define the parking area corresponding to the target parking space Pt3 are lines L7, L8, L9, and L10, which are sides constituting the parallelogram of the target parking space Pt3. The ROM 111 of the control device 11 stores a combination of the lines L7, L8, L9, and L10 defining the parking area as a pattern corresponding to the scene of FIG. 5C. Then, the parking spaces P detected by using the parking space detection function is presented to the driver by using the parking space display function.

As described above, the parking space detection function of the control device 11 of the present embodiment is used to detect, at an arbitrary location, whether or not there are spaces in which the subject vehicle can be parked. Additionally or alternatively, when a parking space in a parking lot that is used relatively frequently, such as a parking lot at home or a parking lot at workplace, is preliminarily registered in the parking assistance system 1, the control device 11 has a function of detecting the preliminarily registered parking space.

The registration process for a specific parking space and its verification process will now be described. When there is a parking space for which the driver would like to use the autonomous parking control for next parking, such as in a parking lot at home or a parking lot at workplace, for example, the driver parks the subject vehicle in the parking space, and in this state, presses a parking space registration button provided on the parking assistance device 10. This allows the subject vehicle position detection device including a GPS unit, a gyro sensor, etc. of the control device 11 to store the latitude and longitude of the parking space in a memory of the control device 11 (with the use of the environment information acquisition function). At the same time, the imaging device 20 is used to capture an image around the subject vehicle, and this image is stored in the memory of the control device 11 as a reference image. Through this operation, the positional information of the parking space and the reference image are associated with each other and stored, and the registration process for a specific parking space is completed. Then, when the subject vehicle approaches the parking space after that and is to be parked in the parking space, the parking space can be set as one of target parking spaces for the autonomous parking control.

The reference image which is preliminarily stored in the control device 11 of the present embodiment is an image for specifying the target parking space, but a plurality of different reference images are stored, rather than one reference image. The plurality of different reference images as referred to herein mean those including at least any of a plurality of reference images captured from different viewpoint positions, a plurality of reference images captured in different line-of-sight directions, and a plurality of reference images captured by different conversion methods.

The plurality of reference images captured from different viewpoint positions can be generated using image data captured by the imaging device 20 in the same manner as in the image processing using the image processing device 30 described with reference to FIG. 2. For example, images captured from different viewpoint positions with different heights (z coordinates) or different positions (x-y coordinates) on a plane can be used as the reference images even when the direction of sightline is the same from above to below. Likewise, the plurality of reference images captured in different line-of-sight directions can be generated by the image processing device 30 using image data captured by the imaging device 20. For example, images captured in different line-of-sight directions such as the vertically downward line-of-sightline direction and the horizontal line-of-sightline direction can be used as the reference images even when the viewpoint position is the same above the subject vehicle. The plurality of reference images captured by different conversion methods can also be generated by the image processing device 30 using image data captured by the imaging device 20, and for example, an image subjected to fisheye conversion and an image not subjected to fisheye conversion can be generated. Other than the above, a plurality of reference images may be generated and stored in which both the viewpoint positions and the line-of-sight directions are different, both the viewpoint positions and the conversion methods are different, both the line-of-sight directions and the conversion methods are different, or all three of these are different.

As the image data captured by the imaging device 20 and used to generate the reference images, only the image data captured by one camera may be used to generate the reference images, or a plurality of image data items captured by a plurality of cameras may also be used to generate the reference images.

Such reference images are generated by pressing a registration button or the like provided on the parking assistance device 10 of the present embodiment, and stored in a memory of the control device 11. That is, when the registration button is pressed, the imaging device 20 captures one or more images around the subject vehicle, and the image processing device 30 processes the one or more images to generate the reference images. In this operation, the plurality of different reference images to be stored may be automatically stored as those that are preliminarily set in predetermined forms such as viewpoint positions, line-of-sight directions, or a conversion methods, or part or all of the forms may be presented to the driver and selected by the driver. When the reference images are made, the entire images generated by the image processing device 30 may be used as the reference images, or portions to be feature portions of the images generated by the image processing device 30 may be extracted automatically or selected by the driver.

Figure 6:
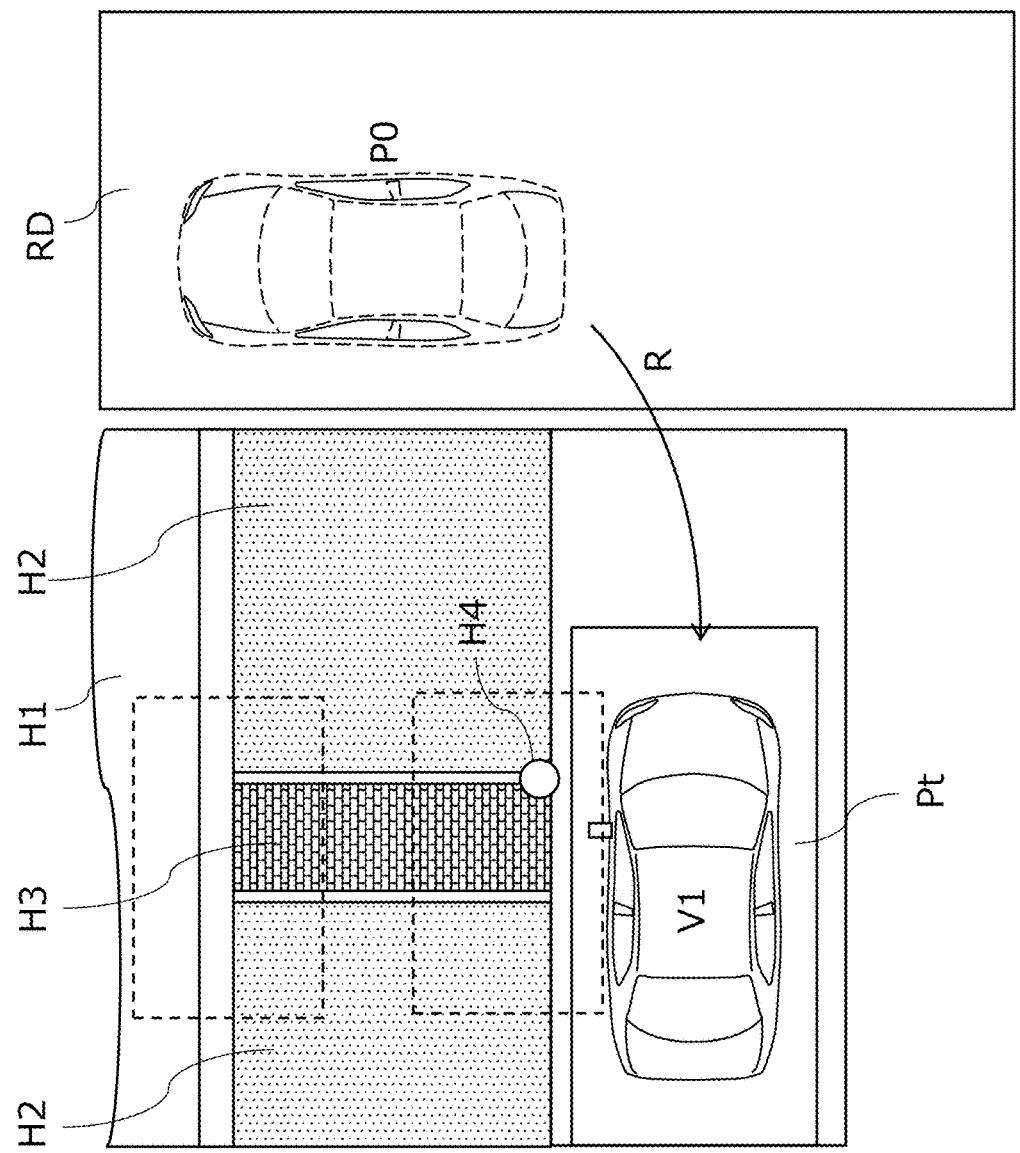
FIG. 6 is a plan view illustrating an example of a parking space.

FIG. 6 is a plan view illustrating an example of a parking space that is preliminarily registered. The parking space illustrated in the figure is a parking space of the driver's home, and it is assumed that the driver's home has a house H1, a courtyard H2, and a passage H3 of the courtyard and the target parking space Pt is located next to the courtyard H2. H4 represents a pole erected at the end of the passage H3, and RD represents a road in front of the driver's home. It is also assumed that in a state in which the subject vehicle V1 is parked in the target parking space Pt, that is, in a state of parking completion, the parking assistance device 10 of the present embodiment uses the image data captured by the imaging device 20b of the imaging device 20 attached to the left door mirror, and the image processing device 30 generates an image IM3 viewed just below from the virtual viewpoint VP1 illustrated in FIG. 2 and an image IM4 viewed horizontally outward from the virtual viewpoint VP2.

Figure 7A:
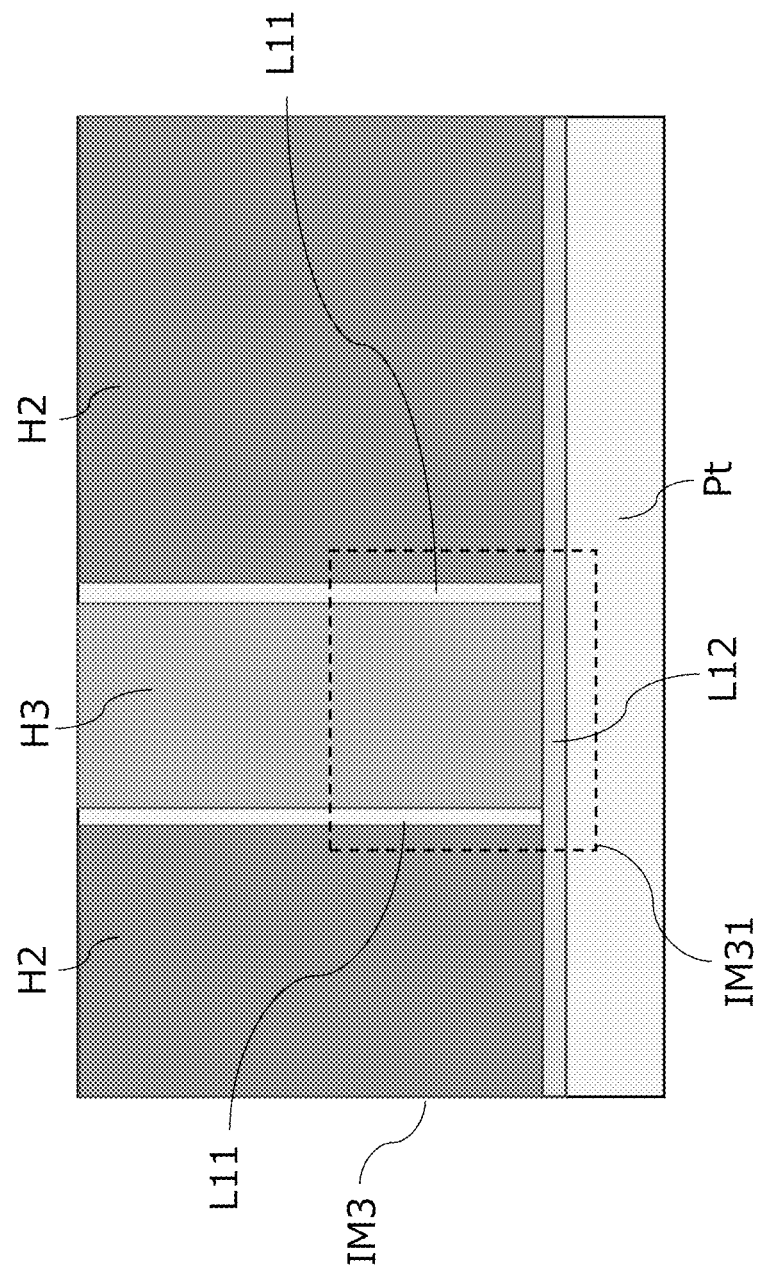
FIG. 7A is a diagram illustrating an example of a first reference image to be registered in the parking assistance device of FIG. 1.
Figure 7B:
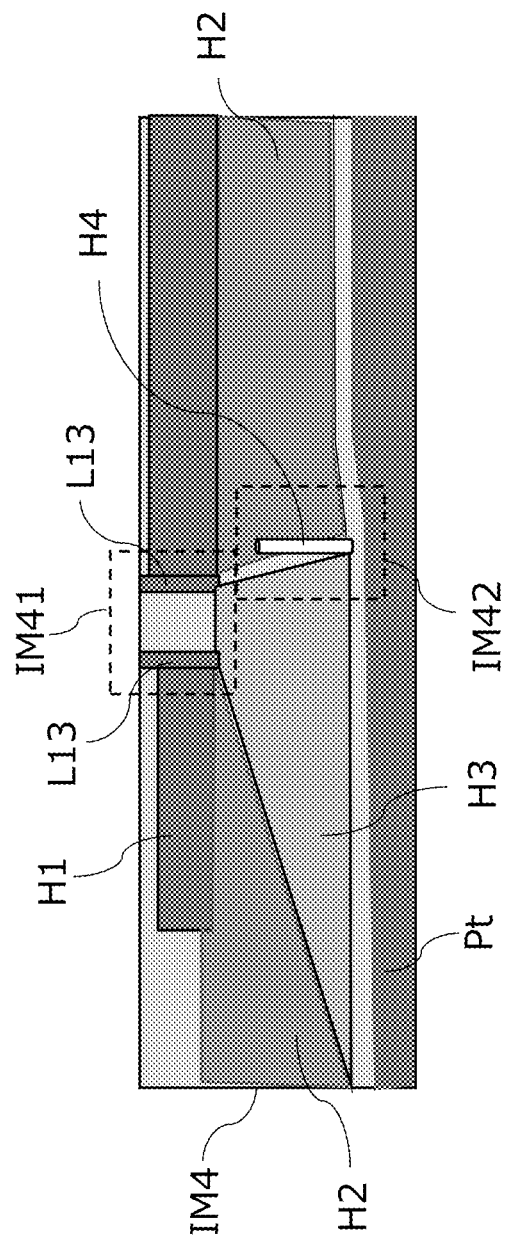
FIG. 7B is a diagram illustrating an example of a second reference image to be registered in the parking assistance device of FIG. 1.

FIG. 7A is a diagram illustrating an example of a first reference image IM31 to be registered in the parking assistance device 10, and FIG. 7B is a diagram illustrating examples of second reference images IM41 and IM42 to be registered in the parking assistance device 10. The image IM3 illustrated in FIG. 7A is a planar image, viewed just below from the virtual viewpoint VP1, of the scenery on the left side of the subject vehicle V1 parked in the target parking space Pt. Therefore, a boundary line L11 between the courtyard H2 and the passage H3 and a boundary line L12 between the courtyard H2 and the parking space Pt are features suitable for verification. On the other hand, the courtyard H2 itself is uniform in color without patterns or the like and has no features, and therefore is not suitable for verification. Thus, in the present embodiment, an image IM31 of a portion including the boundary lines L11 and L12 is used as the first reference image.

An image IM4 illustrated in FIG. 7B is a front image of the scenery on the left side of the subject vehicle V1 parked in the target parking space Pt, viewed from the virtual viewpoint VP2 toward the house H1 in the horizontal direction. Therefore, vertical lines L13 of entrance walls of the house H1 and the pole H4 at the end of the passage H3 are features suitable for verification. On the other hand, although the courtyard H2 and the passage H3 have the boundary lines L11 and L12, they are not suitable for verification because they do not appear with remarkable features in the front image viewed horizontally. Thus, in the present embodiment, at least one of the image IM41 of a portion including the vertical lines L13 and the image IM42 of a portion including the pole H4 is used as the second reference image.

The plurality of different reference images stored in the memory of the control device 11, or the first reference image IM31 and the second reference image IM41 or IM42, are read out from the memory of the control device 11 and used as reference images for a verification process when after that the driver sets the parking space at home as the target parking space Pt. As illustrated in FIGS. 7A and 7B, the reference images stored in the memory of the control device 11 are the images IM31 and IM41 or IM42, which are cut out as portions from the entire images IM3 and IM4, and which are particularly features, but instead of this, the entire images IM3 and IM4 may be used as reference images.

In the present embodiment, a matching degree upon verification may be set for each of the plurality of different reference images, and the set matching degree may be used for calculation of the positional information of the target parking space Pt. The matching degree in the present embodiment is a degree of likelihood, correlation coefficient, etc. that the matching probability of a reference image is estimated to be high, and is a characteristic value that is 1 (one) or 100% when the sum of the matching degrees of all the reference images is calculated. For example, when an image contains a feature that can be easily distinguished from other images, or when an image contains a plurality of different features, the matching degree increases. Then, provided that two reference images that are set with matching degrees of 40% and 60% are registered, for example, when both of these two reference images can be recognized for the current image captured around the subject vehicle, the positional information of a final target parking space may be calculated through weighting by 60% the positional information of a target parking space calculated based on the reference image whose matching degree is 60%, weighting by 40% the positional information of a target parking space calculated based on the reference image whose matching degree is 40%, and weighted-averaging them.

In the present embodiment, as illustrated in FIG. 6, when a desired target parking space Pt such as a home is registered, a travel route R from a predetermined parking start position PO on the road RD to the target parking space Pt may be tracked and preliminarily stored in the memory of the control device 11 in association with the target parking space Pt. After that, when the subject vehicle V1 is parked in the target parking space Pt, the travel operation of the subject vehicle may be autonomously controlled along the stored travel route R upon recognition of the target parking space Pt by the verification process.

In the present embodiment, when the subject vehicle is parked in the parking space after a plurality of different reference images are stored in the memory of the control device 11, the imaging device 20 is used to capture an image around the subject vehicle, and this image is compared with the reference images to calculate the positional information of the target parking space which is specified with the reference images. In this operation, the current image captured around the subject vehicle is converted into an image form corresponding to each of the plurality of different reference images. For example, when one reference image is the first reference image IM31 which is a planar image viewed just below from the virtual viewpoint VP1 illustrated in FIG. 7A and verification is performed with the first reference image IM31, the image processing device 30 is used to convert the image data captured by the imaging device 20 into a planar image viewed just below from the virtual viewpoint VP1. Likewise, when another reference image is the second reference image IM41 or IM42 which is a front image viewed in the horizontal direction from the virtual viewpoint VP2 illustrated in FIG. 7B and verification is performed with the second reference image IM41 or IM42, the image processing device 30 is used to convert the image data captured by the imaging device 20 into a front image viewed in the horizontal direction from the virtual viewpoint VP2.

In the present embodiment, when the verification process is performed between the current image captured around the subject vehicle and a plurality of different reference images, the verification process may be performed between the current image captured around the subject vehicle and all the plurality of different reference images and may also be performed between the current image captured around the subject vehicle and some reference images of the plurality of different reference images. Then, when the verification process is performed between the current image captured around the subject vehicle and all the plurality of different reference images, the positional information of the target parking space Pt is calculated from all the reference images that can be recognized, such as by weighting with the above-described matching degree. When the verification process is performed between the current image captured around the subject vehicle and some reference images of the plurality of different reference images, the plurality of different reference images are sequentially subjected to the verification process. Then, when there is a reference image that can be recognized, the verification process is concluded there even with other reference images remaining, and the positional information of the target parking space Pt is calculated based on the recognized reference image.

Referring again to FIG. 1, the parking space display function of the control device 11 of the present embodiment is a function of displaying the parking spaces P detected by the control device 11 or the preliminarily registered parking space (such as Pt of FIG. 6) on the display 121 in order to present the parking spaces P to the driver. For example, as illustrated in FIG. 3, the control device 11 presents the parking spaces P in the dashed frames to the driver. The driver selects the target parking space Pt for parking the subject vehicle V1 from among the parking spaces P illustrated in FIG. 3. Selection of the target parking space Pt can be performed by touching the screen of the display 121 composed, for example, of a touch panel. Thus, the driver sets the target parking space Pt in this manner, and the control device 11 can thereby calculate the parking route using the parking route calculation function.

The parking route calculation function of the control device 11 of the present embodiment is a function of calculating a parking route to the set target parking space Pt in order to park the subject vehicle V1 in the target parking space Pt.

Figure 9:
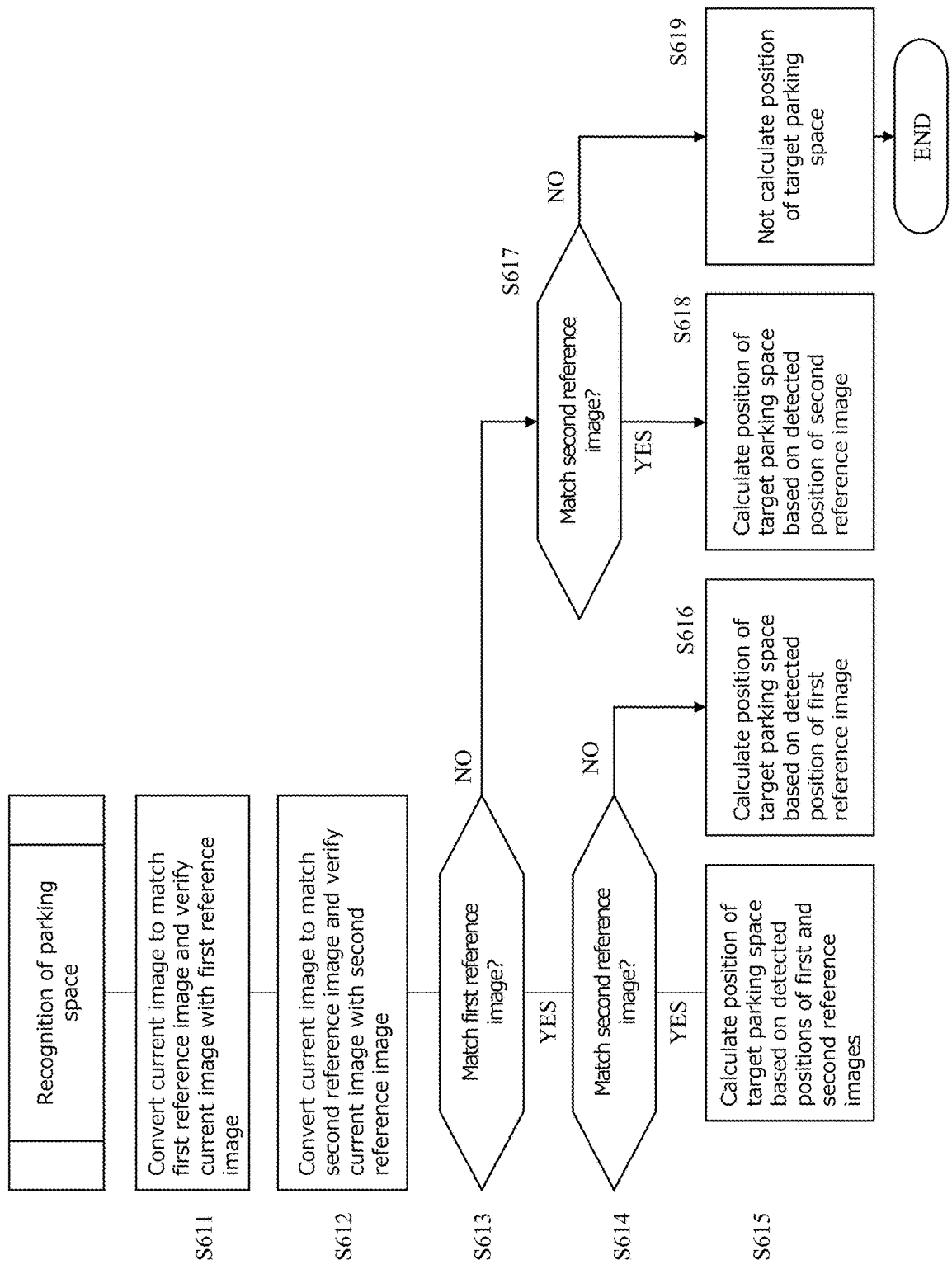
FIG. 9 is a flow chart illustrating an example of a subroutine of step S6 in FIG. 6.
Figure 10:
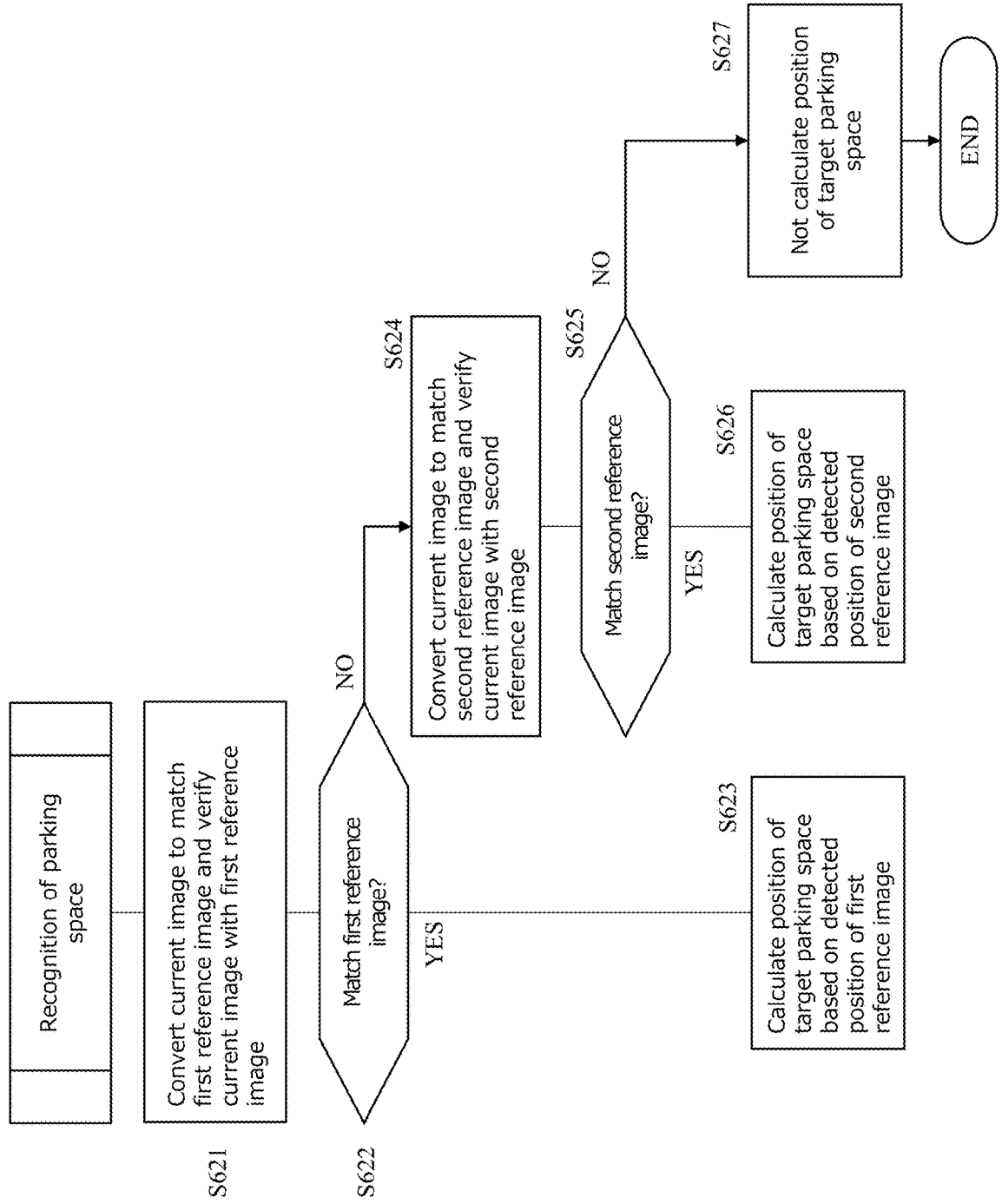
FIG. 10 is a flow chart illustrating another example of the subroutine of step S6 in FIG. 6.

The parking assistance process executed by the control device 11 of the present embodiment will then be described with reference to FIGS. 8 to 10. FIG. 8 is an example of a flow chart illustrating basic processing of the parking assistance process of the present embodiment, FIG. 9 is a flow chart illustrating an example of a subroutine of step S6 in FIG. 6, and FIG. 10 is a flow chart illustrating another example of the subroutine of step S6 in FIG. 6. The parking assistance process described below is executed by the control device 11 at predetermined time intervals.

In step S1 of FIG. 8, the control device 11 determines whether or not the autonomous parking start button is pressed. For example, when the driver enters a parking lot and presses the autonomous parking start button, the parking assistance process of the present embodiment starts. Additionally or alternatively, the environment information acquisition function may be used to determine whether or not to automatically start the autonomous parking. When a determination is made to start the autonomous parking, the routine proceeds to step S2, or otherwise this step S1 is repeated.

In step S2, a determination is made whether or not the driver selects a registered parking space that is preliminarily registered in the memory of the control device 11. When the registered parking space is selected, the routine proceeds to step S6, or otherwise the routine proceeds to step S3.

When a registered parking space is not selected, in step S3, the control device 11 uses the parking space detection function together with the images, which are acquired by the imaging device 200, to create the overhead image IM1 with the image processing device 30. Then, the parking areas are detected from the overhead image IM1, and the parking spaces P are detected from the parking areas by using the imaging device 200 and the ranging device 40.

In the subsequent step S4, the control device 11 uses the parking space display function to present the parking spaces P to the driver using the display 121. The driver selects a desired parking space from among the displayed parking spaces P and sets it as the target parking space. In step S5, the control device 11 determines whether or not the target parking space Pt for parking the subject vehicle V1 is set from among the parking spaces P. When a determination is made that the driver does not select the target parking space Pt for parking the subject vehicle V1 from among the parking spaces P, the routine returns to step S4, in which the parking spaces P are continued to be presented to the driver until the driver selects the target parking space Pt. On the other hand, when a determination is made that the driver selects the target parking space Pt for parking the subject vehicle V1 from among the parking spaces P, the routine proceeds to step S7.

Referring again to step S2, when the driver selects a registered parking space in step S2, the routine proceeds to step S6. FIG. 9 is a flow chart illustrating the subroutine of step S6. When the driver selects a registered parking space, the current image captured by the imaging device 20 around the subject vehicle is verified with a plurality of different reference images that are preliminarily registered, and the target parking space Pt is recognized to calculate the positional information of the target parking space Pt.

Specifically, in step S611 of FIG. 9, the current image captured by the imaging device 20 around the subject vehicle is converted to match the form of the first reference image IM31 and verified with the first reference image IM31. In the present embodiment, since the first reference image IM31 is a planar image viewed just below from the virtual viewpoint VP1, the current image captured by the imaging device 20 around the subject vehicle is converted into a planar image viewed just below from the virtual viewpoint VP1. Then, the first reference image IM31 in the current image around the subject vehicle is recognized by using a conventionally known matching scheme with a template image, a feature verification scheme, or other verification scheme.

In the subsequent step S612, the current image captured by the imaging device 20 around the subject vehicle is converted to match the form of the second reference image IM41 or IM42 and verified with the second reference image IM41 or IM42. In the present embodiment, since the second reference image IM41 or IM42 is a front image viewed in the horizontal direction from the virtual viewpoint VP2, the current image captured by the imaging device 20 around the subject vehicle is converted into a front image viewed in the horizontal direction from the virtual viewpoint VP2. Then, the second reference image IM41 or IM42 in the current image around the subject vehicle is recognized by using a conventionally known matching scheme with a template image, a feature verification scheme, or other verification scheme.

In the subsequent step S613, as a result of the verification executed in step S611, a determination is made whether or not there is a portion matching the first reference image IM31 in the current image around the subject vehicle, and when a determination is made that there is a matching portion, the routine proceeds to step S614, while when a determination is made that there is not a matching portion, the routine proceeds to step S617.

In step S614, as a result of the verification executed in step S612, a determination is made whether or not there is a portion matching the second reference image IM41 or IM42 in the current image around the subject vehicle, and when a determination is made that there is a matching portion, the routine proceeds to step S615, while when a determination is made that there is not a matching portion, the routine proceeds to step S616. On the other hand, when a determination is made in step S613 that there is not a portion matching the first reference image IM31 in the current image around the subject vehicle, this determination is followed by step S617. In step S617, as a result of the verification executed in step S612, a determination is made whether or not there is a portion matching the second reference image IM41 or IM42 in the current image around the subject vehicle, and when a determination is made that there is a matching portion, the routine proceeds to step S618, while when a determination is made that there is not a matching portion, the routine proceeds to step S619.

In step S615, since a determination is made in step S613 that there is a portion matching the first reference image IM31 and a determination is further made in step S614 that there is a portion matching the second reference image IM41 or IM42, the position of the target parking space Pt is calculated based on the detected positions of the first reference image IM31 and the second reference image IM41 or IM42. In this operation, when the matching degrees are set for the first reference image IM31 and the second reference image IM41 or IM42, the position of the target parking space Pt is calculated by a weighted average using the matching degrees.

In step S616, since a determination is made in step S613 that there is a portion matching the first reference image IM31 and a determination is made in step S614 that there is not a portion matching the second reference image IM41 or IM42, the position of the target parking space Pt is calculated based on the detected position of the first reference image IM31. In this case, the second reference image IM41 or IM42 is not used for calculating the position of the target parking space Pt.

In step S618, since a determination is made in step S613 that there is not a portion matching the first reference image IM31 and a determination is made in step S614 that there is a portion matching the second reference image IM41 or IM42, the position of the target parking space Pt is calculated based on the detected position of the second reference image IM41 or IM42. In this case, the first reference image IM31 is not used for calculating the position of the target parking space Pt.

In step S619, since a determination is made in step S613 that there is not a portion matching the first reference image IM31 and a determination is further made in step S614 that there is not a portion matching the second reference image IM41 or IM42, the parking assistance process is concluded without calculating the position of the target parking space Pt.

After executing any of the processes of steps S615, S616, and S618, the routine proceeds to step S7 of FIG. 8.

In step S7, the control device 11 uses the parking route calculation function to calculate the parking route R along which the subject vehicle V1 moves from the current position or from the position after changing the traveling direction to the set target parking space Pt. In step S8, the control device 11 uses the travel operation planning function to plan a travel operation for the subject vehicle V1 to park along the calculated parking route R and executes the parking assistance for the subject vehicle V1 in accordance with the calculated travel route R and the planned travel operation using the vehicle controller 50, the drive system 60, the vehicle speed sensor 70, and the steering angle sensor 80. When the registered parking space is selected in step S2 and the parking route R associated with the positional information of the registered target parking space Pt is stored, it is read out in step S7.

During execution of the parking assistance in step S8, the control device 11 uses the environment information acquisition function together with the imaging device 200 and the ranging device 40 to detect obstacles around the subject vehicle V1 and executes the parking assistance while avoiding the interference with the obstacles.

In step S9, a determination is made whether or not the subject vehicle V1 has completed the parking in the target parking space Pt, and the parking assistance in step S8 continues until the subject vehicle V1 completes the parking.

In the recognition process for the parking space illustrated in FIG. 9, the verification is performed with all the reference images registered in the memory of the control device 11, that is, the first reference image IM31 and the second reference image IM41 or IM42, but as illustrated in FIG. 10, the verification may be performed with one or some of the reference images registered in the memory of the controller 11. FIG. 10 is a flow chart illustrating another example of the subroutine of step S6 in FIG. 8.

Specifically, in step S621 of FIG. 10, the current image captured by the imaging device 20 around the subject vehicle is converted in accordance with the form of the first reference image IM31 and verified with the first reference image IM31. In the present embodiment, since the first reference image IM31 is a planar image viewed just below from the virtual viewpoint VP1, the current image captured by the imaging device 20 around the subject vehicle is converted into a planar image viewed just below from the virtual viewpoint VP1. Then, the first reference image IM31 in the current image around the subject vehicle is recognized by using a conventionally known matching scheme with a template image, a feature verification scheme, or other verification scheme.

In the subsequent step S622, as a result of the verification executed in step S621, a determination is made whether or not there is a portion matching the first reference image IM31 in the current image around the subject vehicle, and when a determination is made that there is a matching portion, the routine proceeds to step S623, while when a determination is made that there is not a matching portion, the routine proceeds to step S624.

In step S623, since a determination is made in step S622 that there is a portion matching the first reference image IM31, the position of the target parking space Pt is calculated based on the detected position of the first reference image IM31. In this case, the second reference image IM41 or IM42 is not used for calculating the position of the target parking space Pt.

On the other hand, in step S624, the current image captured by the imaging device 20 around the subject vehicle is converted to match the form of the second reference image IM41 or IM42 and verified with the second reference image IM41 or IM42. In the present embodiment, since the second reference image IM41 or IM42 is a front image viewed in the horizontal direction from the virtual viewpoint VP2, the current image captured by the imaging device 20 around the subject vehicle is converted into a front image viewed in the horizontal direction from the virtual viewpoint VP2. Then, the second reference image IM41 or IM42 in the current image around the subject vehicle is recognized by using a conventionally known matching scheme with a template image, a feature verification scheme, or other verification scheme.

In the subsequent step S625, as a result of the verification executed in step S624, a determination is made whether or not there is a portion matching the second reference image IM41 or IM42 in the current image around the subject vehicle, and when a determination is made that there is a matching portion, the routine proceeds to step S626, while when a determination is made that there is not a matching portion, the routine proceeds to step S627.

In step S626, since a determination is made in step S622 that there is not a portion matching the first reference image IM31 and a determination is made in step S624 that there is a portion matching the second reference image IM41 or IM42, the position of the target parking space Pt is calculated based on the detected position of the second reference image IM41 or IM42. In this case, the first reference image IM31 is not used for calculating the position of the target parking space Pt.

In step S627, since a determination is made in step S622 that there is not a portion matching the first reference image IM31 and a determination is further made in step S625 that there is not a portion matching the second reference image IM41 or IM42, the parking assistance process is concluded without calculating the position of the target parking space Pt.

As described above, according to the parking assistance device 10 and parking assistance method of the present embodiment, a plurality of different reference images (the first reference image IM31 and the second reference image IM41 or IM42), which are generated by using the imaging device 20 that captures one or more images around the subject vehicle V1, for specifying the target parking space Pt are preliminarily stored, and after that when the subject vehicle is parked in the target parking space Pt, the current image captured around the subject vehicle V1 is verified with at least one reference image of the plurality of different reference images to recognize the target parking space Pt; therefore, the accuracy in recognizing the target parking space Pt can be improved.

Moreover, according to the parking assistance device 10 and parking assistance method of the present embodiment, the travel operation of the subject vehicle V1 to the target parking space Pt along the travel route R is autonomously controlled based on the positional information of the recognized target parking space Pt, and the subject vehicle V1 can therefore be autonomously controlled more reliably.

Furthermore, according to the parking assistance device 10 and parking assistance method of the present embodiment, the current image captured around the subject vehicle V1 is verified with all of the plurality of different reference images (the first reference image IM31 and the second reference image IM41 or IM42) to recognize the target parking space Pt, and the accuracy in recognizing the target parking space Pt can therefore be further improved.

In addition, according to the parking assistance device 10 and parking assistance method of the present embodiment, the current image captured around the subject vehicle V1 is verified with one or some of the plurality of different reference images (the first reference image IM31 and the second reference image IM41 or IM42) to recognize the target parking space; therefore, the recognition processing time for the target parking space Pt is shortened, and the recognition processing load is alleviated.

Moreover, according to the parking assistance device 10 and parking assistance method of the present embodiment, the plurality of different reference images (the first reference image IM31 and the second reference image IM41 or IM42) include at least any of a plurality of reference images captured from different viewpoint positions, a plurality of reference images captured in different line-of-sight directions, and a plurality of reference images captured by different conversion methods, and the accuracy in recognizing the target parking space Pt can therefore be further improved.

Furthermore, according to the parking assistance device 10 and parking assistance method of the present embodiment, when the current image captured around the subject vehicle V1 is verified with at least one reference image of the plurality of different reference images (the first reference image IM31 and the second reference image IM41 or IM42), the current image captured around the subject vehicle is converted into an image form corresponding to each of the plurality of different reference images; therefore, the verification process is simplified and the accuracy in verification is improved.

In addition, according to the parking assistance device 10 and parking assistance method of the present embodiment, the matching degree upon verification for each of the plurality of different reference images (the first reference image IM31 and the second reference image IM41 or IM42) is set, and when the current image captured around the subject vehicle V1 is verified with at least one reference image of the plurality of different reference images, the target parking space Pt is recognized by weighting using the set matching degree; therefore, the suitability of verification can be improved in accordance with the environment of the preliminarily registered target parking space Pt, and the accuracy in recognizing the target parking space Pt can be further improved.

Moreover, according to the parking assistance device 10 and parking assistance method of the present embodiment, when the plurality of reference images (the first reference image IM31 and the second reference image IM41 or IM42) are preliminarily stored, the travel route R from a given parking start position to the target parking space Pt is stored, and after that when the subject vehicle V1 is parked in the target parking space Pt, the travel operation of the subject vehicle V1 is autonomously controlled along the stored travel route R upon recognition of the target parking space Pt; therefore, the load for calculating the travel route can be reduced, and at the same time, the time required to start the parking assistance can be shortened.

DESCRIPTION OF REFERENCE NUMERALS

1 . . . Parking assistance system
10 . . . Parking assistance device
11 . . . Control device
111 . . . ROM
112 . . . CPU
113 . . . RAM
12 . . . Output device
121 . . . Display
122 . . . Speaker
20 . . . Imaging device
2a . . . Imaging device disposed on front grill portion of vehicle
2b . . . Imaging device disposed on lower portion of left door mirror of vehicle
2c . . . Imaging device disposed on lower portion of right door mirror of vehicle
2d . . . Imaging device disposed near rear bumper of vehicle
30 . . . Image processing device
40 . . . Ranging device
4a . . . Front ranging device
4b . . . Right-side ranging device
4c . . . Left-side ranging device
4d . . . Rear ranging device
50 . . . Vehicle controller
60 . . . Drive system
70 . . . Vehicle speed sensor
IM1 . . . Overhead image
IM2 . . . Monitor image
IM31 . . . First reference image
IM41, IM42 . . . Second reference image
L1 to L10 . . . Lines
P . . . Parking space
Pt, Pt1, Pt2, Pt3 . . . Target parking space
V1 . . . Subject vehicle
V2, V2a, V2b, V2c, V2d, V2e . . . Other vehicles
VP1, VP2 . . . Virtual viewpoint

The invention claimed is:

1. A parking assistance method comprising:
preliminarily storing a plurality of different reference images for specifying a target parking space, the plurality of different reference images being generated by capturing an image around a subject vehicle using an imaging device in a state in which the subject vehicle is parked in the target parking space, the imaging device being equipped in the subject vehicle;
after that when parking the subject vehicle in the target parking space, verifying a current image captured around the subject vehicle with at least one reference image of the plurality of different reference images to recognize the target parking space; and
autonomously controlling a travel operation of the subject vehicle to the target parking space based on positional information of the recognized target parking space.

2. The parking assistance method according to claim 1, comprising:
verifying the current image captured around the subject vehicle with all reference images of the plurality of different reference images to recognize the target parking space.

3. The parking assistance method according to claim 1, comprising:
verifying the current image captured around the subject vehicle with some reference images of the plurality of different reference images to recognize the target parking space.

4. The parking assistance method according to claim 1, wherein the plurality of different reference images include at least any of a plurality of reference images captured from different viewpoint positions, a plurality of reference images captured in different line-of-sight directions, and a plurality of reference images captured by different conversion methods.

5. The parking assistance method according to claim 1, comprising:
   when verifying the current image captured around the subject vehicle with at least one reference image of the plurality of different reference images, converting the current image captured around the subject vehicle into an image form corresponding to each of the plurality of different reference images.

6. The parking assistance method according to claim 1, comprising:
   setting a matching degree upon verification for each of the plurality of different reference images; and
   when verifying the current image captured around the subject vehicle with at least one reference image of the plurality of different reference images, recognizing the target parking space by weighting using the set matching degree.

7. The parking assistance method according to claim 1, comprising:
   when preliminarily storing the plurality of reference images, storing a travel route from a given parking start position to the target parking space; and
   after that when parking the subject vehicle in the target parking space, autonomously controlling a travel operation of the subject vehicle along the stored travel route upon recognition of the target parking space.

8. A parking assistance device comprising:
a memory configured to preliminarily store a plurality of different reference images including a target parking space, the plurality of different reference images being generated by capturing an image around a subject vehicle using an imaging device in a state in which the subject vehicle is parked in the target parking space, the imaging device being equipped in the subject vehicle; and
a controller configured to:
   after that when parking the subject vehicle in the target parking space, verify a current image captured around the subject vehicle with at least one reference image of the plurality of different reference images to recognize the target parking space; and
   autonomously control a travel operation of the subject vehicle to the target parking space based on positional information of the recognized target parking space.

* * * * *